US010611691B2

(12) United States Patent
Olevano et al.

(10) Patent No.: US 10,611,691 B2
(45) Date of Patent: Apr. 7, 2020

(54) REFRACTORIES FOR APPLICATIONS IN COMBUSTION CHAMBERS INTENDED FOR PRODUCING ENERGY AND/OR WASTE DISPOSAL

(71) Applicant: Rina Consulting—Centro Sviluppo Materiali S.p.A, Rome (RM) (IT)

(72) Inventors: Daniela Olevano, Rome (IT); Stefano Martelli, Rome (IT)

(73) Assignee: RINA CONSULTING—CENTRO SVILUPPO MATERIALI S.P.A., Rome (RM) (IT)

(*) Notice: Subject to any disclaimer, the term of this patent is extended or adjusted under 35 U.S.C. 154(b) by 311 days.

(21) Appl. No.: 15/580,943

(22) PCT Filed: Jun. 11, 2015

(86) PCT No.: PCT/IB2015/054421
§ 371 (c)(1),
(2) Date: Dec. 8, 2017

(87) PCT Pub. No.: WO2016/198917
PCT Pub. Date: Dec. 15, 2016

(65) Prior Publication Data
US 2018/0162778 A1 Jun. 14, 2018

(51) Int. Cl.
*C04B 35/101* (2006.01)
*B32B 18/00* (2006.01)
(Continued)

(52) U.S. Cl.
CPC ............ *C04B 35/101* (2013.01); *B32B 18/00* (2013.01); *C04B 35/1015* (2013.01);
(Continued)

(58) Field of Classification Search
CPC ............ C04B 35/101; C04B 2237/341; C04B 2237/343
(Continued)

(56) References Cited

U.S. PATENT DOCUMENTS 2,838,882 A * 6/1958 Silverman ............... C03B 37/00
65/444
4,330,568 A * 5/1982 Boehm .................. B22D 41/30
156/273.3
2009/0293786 A1* 12/2009 Olver ..................... C04B 35/03
110/336

FOREIGN PATENT DOCUMENTS

CN 203928734 U 11/2014
DE 10302519 B3 7/2004

OTHER PUBLICATIONS

Database WPI, Thomson Scientific, Week May 2015, XP002750872. 1 page.
(Continued)

*Primary Examiner* — Leith S Shafi
*Assistant Examiner* — Nicholas J Chidiac
(74) *Attorney, Agent, or Firm* — Lucas & Mercanti, LLP

(57) ABSTRACT

The present invention relates to refractories with a composition gradient for lining the interior surface of combustion chambers. The invention envisages the use of refractories characterized by the presence of a number of layers with a different chemical composition to form a gradient along the cross section of the material. The presence of the composition gradient serves to combine the corrosion resistance of the surface layer, facing towards the inside of the combustion chamber, with the shock resistance of the bulk material.

10 Claims, 4 Drawing Sheets

(51) Int. Cl.
  *C04B 35/66* (2006.01)
  *C04B 41/00* (2006.01)
  *C04B 41/50* (2006.01)
  *C04B 41/87* (2006.01)
  *F27D 1/00* (2006.01)
  *C04B 35/443* (2006.01)
  *C04B 35/634* (2006.01)
  *C04B 35/63* (2006.01)
  *C04B 35/64* (2006.01)
  *C04B 35/626* (2006.01)

(52) U.S. Cl.
  CPC ........ *C04B 35/443* (2013.01); *C04B 35/6264* (2013.01); *C04B 35/6303* (2013.01); *C04B 35/634* (2013.01); *C04B 35/64* (2013.01); *C04B 35/66* (2013.01); *C04B 41/009* (2013.01); *C04B 41/5031* (2013.01); *C04B 41/87* (2013.01); *F27D 1/0006* (2013.01); *C04B 2235/3206* (2013.01); *C04B 2235/3208* (2013.01); *C04B 2235/3217* (2013.01); *C04B 2235/3222* (2013.01); *C04B 2235/3418* (2013.01); *C04B 2235/3463* (2013.01); *C04B 2235/5427* (2013.01); *C04B 2235/602* (2013.01); *C04B 2235/608* (2013.01); *C04B 2235/6022* (2013.01); *C04B 2235/6027* (2013.01); *C04B 2235/612* (2013.01); *C04B 2235/75* (2013.01); *C04B 2235/9607* (2013.01); *C04B 2235/9615* (2013.01); *C04B 2235/9669* (2013.01); *C04B 2235/9684* (2013.01); *C04B 2237/341* (2013.01); *C04B 2237/343* (2013.01); *C04B 2237/58* (2013.01); *C04B 2237/588* (2013.01); *C04B 2237/704* (2013.01); *Y02P 40/67* (2015.11)

(58) Field of Classification Search
  USPC .......................................................... 501/41
  See application file for complete search history.

(56) References Cited

OTHER PUBLICATIONS

International Search Report and Written Opinion for International Application No. PCT/IB2015/054421(12 Pages) (dated Jan. 4, 2016).

* cited by examiner

REFRACTORIES FOR APPLICATIONS IN COMBUSTION CHAMBERS INTENDED FOR PRODUCING ENERGY AND/OR WASTE DISPOSAL

CROSS-REFERENCE TO RELATED APPLICATIONS

This application is a 371 of PCT/IB2015/054421, filed Jun. 11, 2015.

FIELD OF THE INVENTION

The matter of the present invention refers to refractory materials with a composition gradient and the use thereof to line the interior surface of combustion chambers. The field of application ranges from conventional coal-fired combustion units for producing energy to incinerators for waste disposal, preferably municipal solid waste. For coal-fired combustion units in particular, the current tendency is to replace, in part, the fossil fuel with biomass in a process that takes the name of co-combustion. Both in incinerators and during co-combustion processes, given the high variability of the chemical species involved, phenomena are triggered which damage the interior linings of the plant, reducing the average life thereof.

The invention has application with the use of refractory materials characterized by the presence of several layers with a different chemical composition such as to form a gradient along the cross section of the material. The presence of a composition gradient serves to combine the corrosion resistance of the surface layer, facing towards the inside of the combustion chamber, with the thermal shock resistance of the bulk of the material. It follows that a refractory with a composition gradient is better suited to resist in critical environments than conventional refractories.

BACKGROUND OF THE INVENTION

The refractories currently used as interior linings of combustion chambers are prevalently mullite based. They are aluminosilicate refractories characterized by a good shock resistance.

However, in the presence of biomass, the combustion releases alkaline species, such as potassium (K) and sodium (Na), which act upon refractories according to two prevalent pathways:
1. they react with the silica ($SiO_2$), lowering its melting point and thus facilitating phenomena of corrosion/erosion;
2. in the absence of silica, they react with the alumina ($Al_2O_3$), producing crystalline phases with an expansion in volume and possible chipping of the refractory.

In the particular case of plants that use fluidized bed combustion, the phenomenon of corrosion is accompanied by that of erosion, caused by the circulation of the bed. Refractories containing silica are particularly damaged in the presence of alkali corrosion and erosion caused by the fluidized bed.

To obviate such phenomena of damage, two types of refractories are used:
1. Dense materials with a high content of alumina;
2. Dense materials based on silicon carbide (SiC).

These two solutions are exceedingly costly and introduce problems of thermal cycling.

An alternative proposal is a refractory with a composition gradient (compositionally graded refractory) which optimizes the property of shock resistance together with corrosion resistance.

For the design of blast furnace hearths, patent CN203728861 proposes a distribution of refractory carbon bricks with a thermal conductivity gradient in order to reduce breakage caused by thermal shocks; however, it provides no indications as to how also to solve the problem of corrosion resistance.

DESCRIPTION OF THE INVENTION

The present invention proposes a particular combination of chemical species making up the refractory material with a composition gradient utilizable in plants for co-combustion with biomass or in incinerators, as per the claims. The terms refractory and refractory material are interchangeable.

DETAILED DESCRIPTION OF THE INVENTION

The proposed solution consists in the use of refractory materials with a composition gradient, wherein the compositional variation is achieved starting from two types of refractory material:
- A higher quality material (free of silica, rich in alumina and with a variable percentage of calcium oxide (CaO) and/or magnesia (MgO)), used for the layer facing towards the combustion environment (fire side), so as to lend properties of corrosion resistance to the surface;
- A more economical and conventional material (e.g.: mullite, andalusite) resistant to thermal shock, used in the thick part of the refractory at the back (bulk side) and whose function is to thermally insulate and withstand thermal shocks;

The invention further proposes interposing at least a third layer with an intermediate composition (intermediate layer) so as to decrease/eliminate possible stresses generated by the different thermal expansions and facilitate adhesion between the two outer layers.

Figure 1:
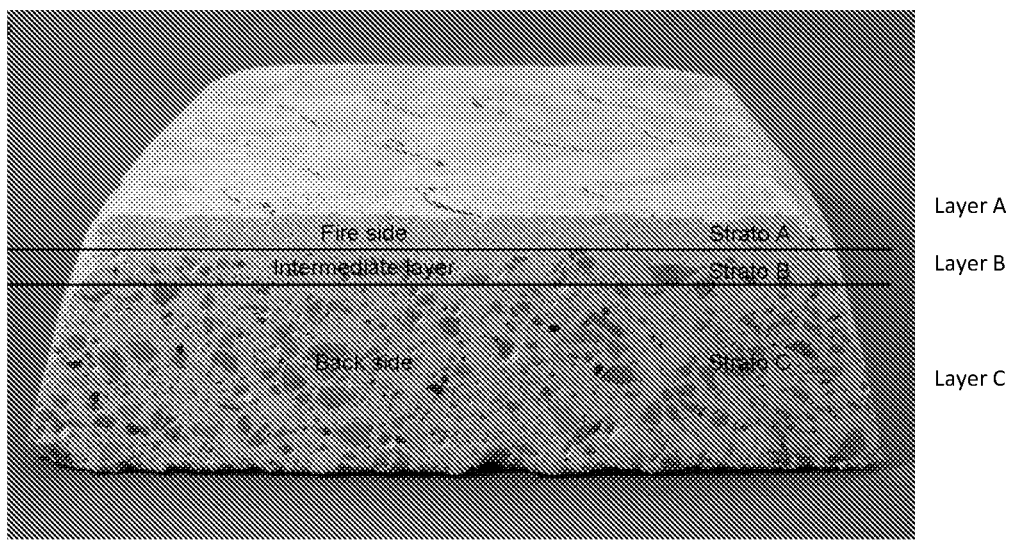
FIG. 1: perspective view of the cross section of a refractory with a composition gradient. The layers with a different chemical composition are identified along the cross section of the composite.

FIG. 1 shows a perspective view of the cross section of a typical refractory composite made according to the criteria of the proposed invention. The three layers with a different chemical composition are indicated in the figure: Fire side (A), Intermediate layer (B), and Bulk side (C). This is the basic configuration of the refractory composite. In order to improve adhesion and minimize stresses due to the different thermal behaviour of the outer layers (fire side and bulk side), it is possible to make a refractory composite with a composition gradient having an improved configuration characterized by the interposition of a number of transition layers with a different intermediate composition: B1, B2, B3 etc.

In the figure it may further be noted that the refractory composite can be made with flared lateral walls so as to be better adapted for lining the interior of a combustion chamber, the shape of which is commonly cylindrical.

Chemical compositions proposed for the three layers of the refractory composite are indicated in Table 1.

TABLE 1 chemical composition of the three layers of the refractory composite with a composition gradient

| Layer | Position | Function | Chemical composition |
|---|---|---|---|
| A | Fire side | Corrosion resistance | $Al_2O_3$ + MgO + CaO |
| B | Intermediate layer | Adhesion + minimizing stresses | $Al_2O_3$ + MgO + $SiO_2$ + CaO |
| C | Bulk side | Thermal shock resistance | $Al_2O_3$ + $SiO_2$ + CaO |

Layer A, or the "fire side", consists of a refractory with a particle size smaller than or equal to 6 mm, the aim being to create a surface with low porosity and thus less subject to the physical penetration of corrosive agents. The chemical composition of the fire side of the refractory may vary within the intervals indicated in the table below.

TABLE 2 minimum and maximum contents of the compounds making up the chemical composition of layer A, or the "fire side", expressed as a percentage (%) by weight of the final material.

| Fire side (A) Chemical compound | Minimum Content % by weight | Maximum Content % by weight |
|---|---|---|
| $Al_2O_3$ | 80 | 99 |
| MgO | 0 | 10 |
| CaO | 1 | 10 |

For the purpose of preparing the cementitious mixture, distilled water is added in an amount ranging from 3 to 15% of the total weight of the refractory, an amount that is lost during the heat treatment.

The thickness of the fire side layer in the refractory composite preferably varies from 2 to 10 mm.

In a preferred embodiment, magnesia is present as magnesium aluminate ($MgAl_2O$) in the crystallographic form of spinel.

In a further embodiment, in order to obtain a fire side layer particularly resistant to alkali corrosion, part of the calcium oxide and alumina is present in the crystallographic form of calcium hexa-aluminate ($Ca(Al_2O_3)_6$).

The mixture of the intermediate layer, or layer B, consists of particles having a size smaller than or equal to 10 mm. In the basic configuration, the chemical composition of layer B is a mixture with 50% by volume of the refractory material used for the fire side and the remaining 50% consisting of the refractory material of the bulk layer.

The chemical composition of the intermediate layer may vary within the following intervals:

TABLE 3 minimum and maximum contents of the compounds making up the chemical composition of the intermediate layer or layer B, expressed as a percentage (%) by weight of the final material.

| Intermediate layer (B) 50:50 (% by volume of the material of layer A:% by volume of the material of layer C) Chemical compound | Minimum Content % by weight | Maximum Content % by weight |
|---|---|---|
| $Al_2O_3$ | 68 | 95.4 |
| $SiO_2$ | 3.8 | 18 |
| MgO | 0 | 6 |
| CaO | 0.8 | 8 |

In order to facilitate the homogenization of the various constituents, it is proposed to add a dispersing agent to the mix B. A dispersing agent is an organic additive and, like all organic additives, it does not appear in the percentage calculation of the chemical compounds of the refractory. It is added to the refractory mix in an amount ranging from 0 to 3% relative to the total weight of the refractory component. The preferred dispersing agents are synthetic polyelectrolytes such as ammonium polyacrylate or else alumina-based dispersants (such as the ADS and ADW types).

For the purpose of preparing the cementitious mixture, distilled water is added in an amount ranging from 3 to 15% of the total refractory content and which is lost during the heat treatment.

The intermediate layer B of the refractory composite preferably has a thickness varying from 2 to 10 mm.

In the improved configuration, more than one intermediate layer B can be made (B1, B2, B3 etc.), with percentages by volume of the fire side and bulk side materials which may be varied so as to form the composition gradient along the cross section of the refractory.

The refractory material making up the bulk layer, or layer C, of the refractory consists of a refractory cement with a particle size smaller than or equal to 10 mm and has a chemical composition which may vary within the following intervals:

TABLE 4 minimum and maximum contents of the compounds making up the chemical composition of the bulk layer or layer C, expressed as a percentage (%) by weight of the final material.

| Bulk layer (C) Chemical compound | Minimum Content % by weight | Maximum Content % by weight |
|---|---|---|
| $Al_2O_3$ | 50 | 90 |
| $SiO_2$ | 9.5 | 45 |
| CaO | 0.5 | 5.0 |

For the purpose of preparing the cementitious mixture, distilled water is added in an amount ranging from 3 to 15% of the total refractory content and which is lost during the heat treatment.

Layer C of the refractory composite preferably has a thickness of 10 to 80 mm.

In order to produce a refractory composite with a composition gradient intended for characterization, the various mixes can be cast sequentially in to a mould to form the different layers and the material processed according to standard UNI EN ISO 1927-5:2013.

The refractory composite can be applied in the combustion chamber of an industrial plant in two different ways:
1. by spraying, with a spray gun, the three or more successive layers of the refractory mixes with a different chemical composition;
2. by installing a lining made up of refractory composites with a composition gradient previously pre-made by forming in moulds.

DETAILED DESCRIPTION OF THE INVENTION

With the aid of the accompanying figures and examples, a description of particular embodiments will now be provided with the aim of offering a better understanding of the objects, features, advantages and modes of application of the invention. It will be noted that the present invention is not limited only to the examples set forth below.

Example 1: Refractory Composite with a Composition Gradient (MR1) Suitable for Use in Combustion Chambers for the Production of Energy The refractory composite with a composition gradient of example 1 was produced by casting in sequence three refractory cements having a different chemical composition, according to the basic configuration (layers A, B and C). For this purpose, use was made of a wood mould having dimensions of 170×100×65 mm.

In order to obtain a bulk layer, or layer C, about 50 mm thick, an amount of 2004 g of refractory cement was weighed out; the cement had a particle-size class of 6 mm and the following chemical composition:

TABLE 5 chemical composition of the bulk layer, or layer C, of the refractory with a composition gradient

| Bulk layer (C) Chemical compound | Content [g] | Percentage by weight [%] |
|---|---|---|
| $Al_2O_3$ | 1173.9 | 58.6 |
| CaO | 47.4 | 2.4 |
| $SiO_2$ | 782.6 | 39.0 |
| Total | 2003.9 | 100.0 |

This is a typical aluminosilicate-based refractory conventionally used to line combustion chambers. The refractory powder was mixed by means of a mixer and 112 g of distilled water was added slowly in order to obtain a mixture with sufficient fluidity for casting. The mixture was poured into the mould so as to form the so-called bulk layer or layer C. In order to distribute the refractory material evenly in the mould, the system was made to vibrate for 60 seconds on a special platform, with the vibration amplitude being set at 0.50 mm and the frequency at 50 Hz. Then the upper surface of the cast refractory was scratched to facilitate adhesion of the next refractory layer. The bulk layer thus formed will hereinafter be identified with the label SAC.

In order to make an intermediate layer, or layer B, about 5 mm thick, an amount of 50% by volume of the fire side refractory cement was mixed with an equivalent amount (50% by volume) of the bulk side refractory cement so as to obtain a mixture with the following chemical composition:

TABLE 6 chemical composition of the intermediate layer or layer B

| Intermediate layer (B) 50:50 (% by volume of the material of layer A:% by volume of the material of layer C) Chemical compound | Content [g] | Percentage by weight [%] |
|---|---|---|
| $Al_2O_3$ | 195.2 | 77.2 |
| MgO | 14.2 | 5.6 |
| CaO | 4.4 | 1.7 |
| $SiO_2$ | 39.1 | 15.5 |
| Total | 252.9 | 100.0 |

The maximum particle size of the powders used is 6 mm. An alumina-based dispersing agent was added to the above-described refractory mixture (Table 6) in an amount of 1% by weight, relative to the total weight of the refractory component. The powders were mixed with a mixer while an amount of distilled water equal to 11.6 g was added dropwise. A homogeneous mixture was obtained, with a fluidity suitable for casting in the mould above layer C. The mixture was then distributed inside the mould so as to form a layer of homogeneous thickness. The upper surface of layer B was scratched to favour adhesion with the last layer, or layer A, of refractory cement.

In order to form a corrosion resistant layer (fire side) about 10 mm thick, an amount of 610.9 g of refractory cement with the following chemical composition was weighed out and mixed:

TABLE 7 chemical composition of the corrosion resistant layer or fire side

| Fire side (A) Chemical compound | Content [g] | Percentage by weight [%] |
|---|---|---|
| $Al_2O_3$ | 545.9 | 89.4 |
| MgO | 56.7 | 9.3 |
| CaO | 8.3 | 1.3 |
| Total | 610.9 | 100.0 |

Magnesia is present in this mix only as magnesium aluminate ($MgAl_2O$) in the crystallographic form of spinel, whose dilatometric behaviour makes it much more similar to alumina, the main constituent of the fire side, than magnesia. The latter is subject to considerable thermal expansion, which, within a refractory component, can be a cause of breakage during cycling. It follows that the refractory composite containing magnesium aluminate in spinel form is less subject to breakage due to thermal shock than is the case with magnesia.

To facilitate mixing, an alumina-based dispersing agent was added to the above-described mixture in an amount of 1% by weight, relative to the total weight of the refractory component (Table 7).

The maximum particle size of the mixture was 2 mm.

During mixing, 28.1 g of distilled water was added slowly in order to obtain a homogeneous mixture with sufficient fluidity for casting in the mould. The mixture thus obtained was poured over layer B and distributed so as to form a layer of homogeneous thickness (fire side) which we will identify hereinafter with the label MAS.

Figure 2:
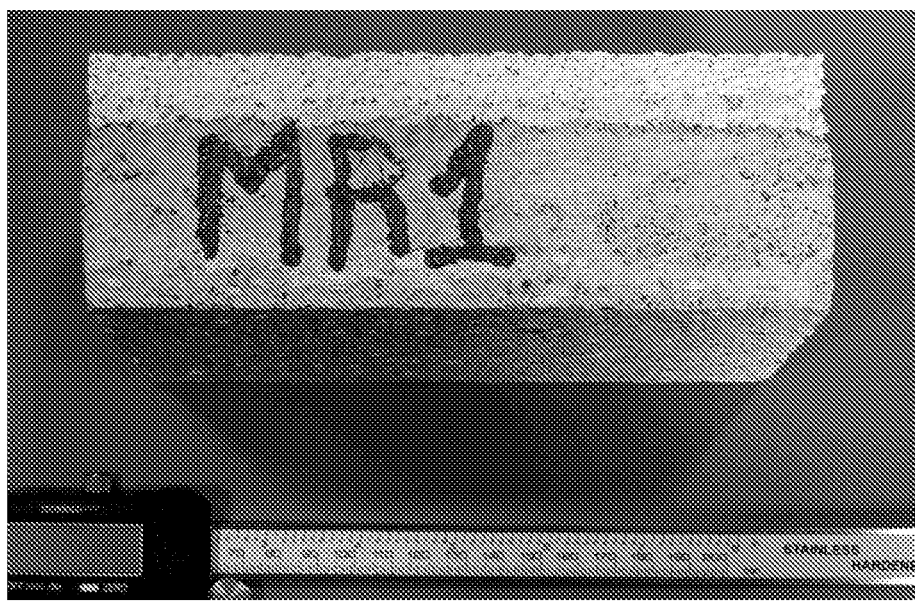
FIG. 2: refractory with a composition gradient for applications in combustion plants in the presence of biomass.

The green composite thus produced was prepared, dried and sintered according to the procedure of standard UNI EN ISO 1927-5:2013. A perspective view of the refractory composite thus produced is shown in FIG. 2.

Example 2: Refractory Composite with a Composition Gradient (BON) Suitable for Use in Plants for Waste Disposal The refractory composite with the composition gradient of example 2 was produced by casting 4 layers of refractory cement in sequence in a mould, the layers having a different chemical composition according to an improved configuration: 2 of the 4 layers (B1 and B2) consisted of an intermediate composition relative to the outer layers (bulk side C and fire side A) in order to improve adhesion and decrease the stresses within the refractory composite. The dimensions of the wood mould used were 170×100×65 mm.

In order to obtain a bulk layer about 45 mm thick, an amount of 1803 g of aluminosilicate-based refractory cement with the following chemical composition was weighed out:

TABLE 8 chemical composition of the bulk layer of the refractory with a composition gradient

| Bulk layer (C) Chemical compound | Content [g] | Percentage by weight [%] |
| --- | --- | --- |
| $Al_2O_3$ | 1056.5 | 58.6 |
| CaO | 42.6 | 2.4 |
| $SiO_2$ | 704.3 | 39.0 |
| Total | 1803.4 | 100.0 |

This is an aluminosilicate-based refractory cement conventionally used to line combustion chambers. The material has a particle-size class of 6 mm. The above-described mixture (Table 8) was mixed by means of a mixer and 99 g of distilled water was added slowly in order to obtain a mixture with sufficient fluidity for casting. The mixture was poured into the mould so as to form the so-called bulk layer, which we will identify hereinafter with the label SAC. In order to distribute the refractory material evenly in the mould, the system was made to vibrate for 30 seconds on a special platform, with the vibration amplitude being set at 0.50 mm and the frequency at 50 Hz. Then the upper surface of the cast refractory was scratched to facilitate adhesion of the next layer.

Two layers (B1 and B2) with an intermediate chemical composition relative to those of the bulk layer and corrosion resistant layer were cast in sequence over the bulk layer.

In order to obtain the first intermediate layer (B1), about 5 mm thick, an amount of 50% by volume of the fire side refractory cement was mixed with an equivalent amount (50% by volume) of the bulk side refractory cement so as to obtain a mixture with the following chemical composition:

TABLE 9 chemical composition of the intermediate layer with the percentage by volume of the bulk composition and the corrosion resistant composition equal to 50:50

| Intermediate layer (B1) 50:50 (% by volume of the material of layer A:% by volume of the material of layer C) Chemical compound | Content [g] | Percentage by weight [%] |
| --- | --- | --- |
| $Al_2O_3$ | 202.1 | 81.3 |
| CaO | 7.5 | 3.0 |
| $SiO_2$ | 39.1 | 15.7 |
| Total | 248.7 | 100.0 |

The maximum particle size of the powders used was 6 mm.

In order to facilitate the homogenization of the mix, an alumina-based dispersing agent was added to the above-described refractory mixture (Table 9) in an amount of 1% by weight, relative to the total weight of the refractory component.

The mixture was mixed by means of a mixer while an amount of distilled water equal to 11.7 g was added slowly. A homogeneous mixture was obtained, with a fluidity suitable for casting in the mould above the bulk layer. The mix was distributed in such a way as to form a layer of constant thickness. The upper surface of the layer was scratched to favour adhesion of the third layer of refractory cement.

In order to obtain a further intermediate layer (B2), about 5 mm thick, an amount of 75% by volume of the fire side refractory cement was mixed with an amount of 25% by volume of the bulk side refractory cement so as to obtain a mixture with the following chemical composition:

TABLE 10

Chemical composition of the intermediate layer with a percentage by volume of the corrosion resistant layer relative to the bulk layer equal to 75:25

| Intermediate layer (B2) 75:25 (% by volume of the material of layer A:% by volume of the material of layer C) Chemical compound | Content [g] | Percentage by weight [%] |
| --- | --- | --- |
| $Al_2O_3$ | 244 | 89.6 |
| CaO | 8.8 | 3.2 |
| $SiO_2$ | 20 | 7.2 |
| Total | 272.8 | 100.0 |

The maximum particle size of the powders used was 6 mm.

An alumina-based dispersing agent was also added to the above-described refractory mixture (Table 10) in an amount of 1% by weight, relative to the total weight of the refractory component.

All the ingredients were then mixed with a mixer, with an amount of water equal to 13.1 g being added dropwise in order to fluidize the mixture and make it castable. The mixture was then poured into the mould and distributed so as to form a layer of homogeneous thickness.

In order to obtain a corrosion resistant layer (fire side) about 10 mm thick, an amount of 594 g of refractory cement with the following chemical composition was weighed out:

TABLE 11 chemical composition of the corrosion
resistant layer or fire side layer

| Fire side (A) Chemical compound | Content [g] | Percentage by weight [%] |
|---|---|---|
| $Al_2O_3$ | 573.5 | 96.6 |
| CaO | 20.5 | 3.4 |
| Total | 594.0 | 100.0 |

It will be noted that in order to obtain a fire side layer particularly resistant to alkali corrosion, use was made of part of a refractory mixture in which part of the calcium oxide and alumina is present in the crystallographic form of calcium hexa-aluminate ($Ca(Al_2O_3)_6$), whose properties of resistance to alkali corrosion are well known.

With the aim of facilitating the homogenization of the compounds, an alumina-based dispersing agent was added to the above-described mixture (Table 11) in an amount of 1.5% relative to the total weight of the refractory component.

The maximum particle size of the powders used was 2 mm.

During mixing, 27.9 g of distilled water was added slowly in order to obtain a homogeneous mixture with sufficient fluidity for being cast in the mould to form the corrosion resistant layer. The mixture was then leveled so as to obtain a layer of homogeneous thickness, which we will identify hereinafter with the label CA6 (fire side A).

The green composite thus produced was prepared, dried and sintered according to the procedure of standard UNI EN ISO 1927-5:2013.

Characterization of the Refractory with a Composition Gradient

Corrosion Test

Figure 3:
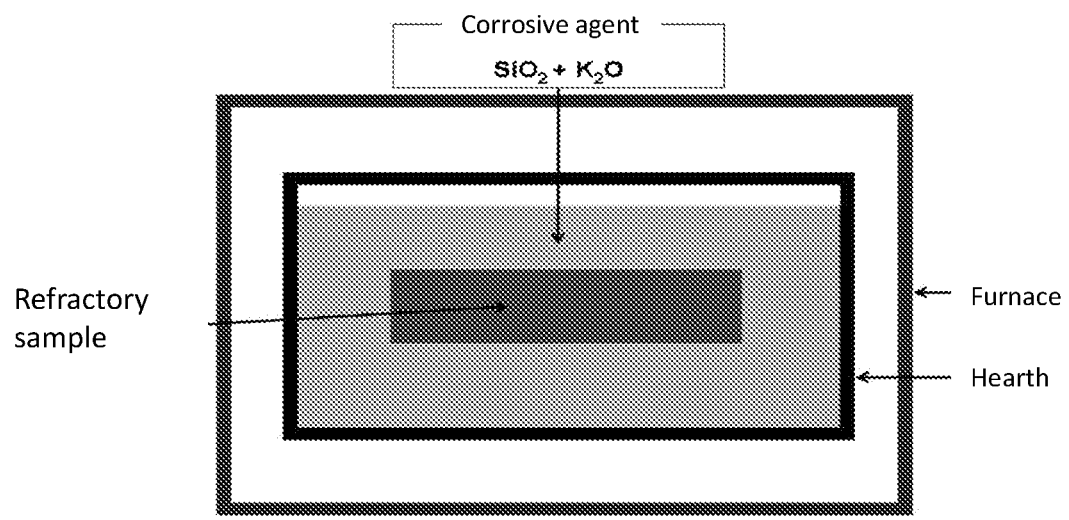
FIG. 3: diagram of a corrosion test with a corrosive mixture (slag) consisting of $SiO_2/K_2O$.

In order to verify the corrosion resistance of the refractory composites thus produced, tests were carried out according to the static scheme shown in FIG. 3. These are tests for which no specific standards are available.

The sample subjected to testing consisted solely of the fire side layer of the refractory composite, which, during the process is directly exposed to the aggressive atmosphere of the combustion chamber.

During the test, a representative fraction of the fire side layer was immersed in a corrosive mixture (slag) consisting of $SiO_2/K_2O$ with a ratio of 2.5 by weight. The slag composition was chosen because it is representative of the species which enter into contact with the refractory during co-combustion processes. It will be noted that the agents that are corrosive for the refractory under these conditions are essentially alkaline species. In this specific test, potassium tends to penetrate into the refractory, forming low melting point phases with the silica or, alternatively, in the presence of alumina, crystalline phases with an expansion in volume. Both situations damage the refractory. For this reason, the objective of the test is to verify the concentration of potassium at a different distance from the surface of the refractory after the test. The test is conducted by maintaining the slag/refractory system at a temperature of 950° C., representative of the co-combustion process, for 72 hours.

Figure 4:
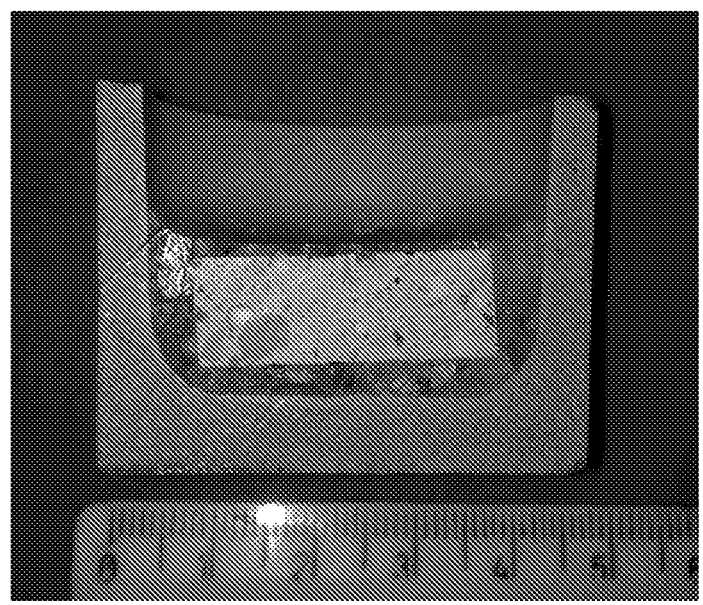
FIG. 4: Typical cross section of a refractory after a corrosion test. The sample (white rectangle in the centre) is surrounded by solidified corrosive slag (vitreous layer) and the hearth (outer portion).

The samples subjected to testing were obtained both from the refractory composite of example 1, MAS (fire side or layer A of the refractory material MR1 of example 1), and from the refractory composite of example 2, CA6 (fire side or layer A of the refractory material BON of example 2). For the sake of comparison, the aluminosilicate-based material making up the bulk layer of the two examples (SAC) was also tested because it is representative of the materials conventionally used in combustion chambers (FIG. 4).

Figure 5:
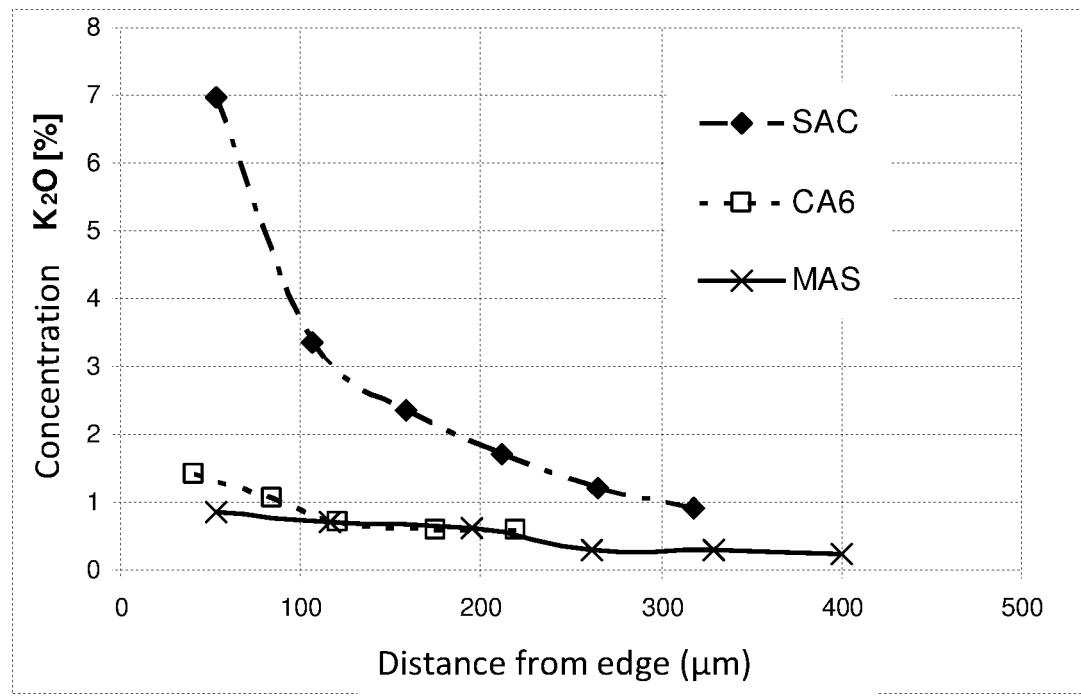
FIG. 5: Penetration of potassium, a corrosive agent, in a refractory with a different chemical composition.

At the end of each test the tested samples were investigated by scanning electron microscopy (SEM). The concentration of potassium (corrosive agent) at a different distance from the edge was measured by energy dispersive spectroscopy (EDX) in order to verify the penetration. The results of the analysis have been compared in the graph in FIG. 5.

From the graph one notes that the penetration of the corrosive agent is distinctly lower ($[K_2O] \leq 1.5\%$) in the case of the new materials (CA6 and MAS), which make up the fire side of the refractory with a composition gradient, than in the material (SAC) ($7\% > [K_2O] > 1\%$), conventionally used in combustion chambers. Based on these results, it may be concluded that the presence of the facing layer, or fire side, both in the composition based on magnesium aluminate in the spinel form (MAS) and in the composition based on calcium hexa-aluminate (CA6), assures excellent properties of corrosion resistance in the refractory with a composition gradient compared to conventional refractories.

Measurement of Thermal Conductivity

The determination of the thermal conductivity of the layers of the refractory with a composition gradient is necessary to enable a correct dimensioning of the refractory based on the degree of thermal insulation that must be reached in the combustion chamber.

The thermal diffusivity ($\alpha$) and the specific heat ($C_p$) of the outer layers of the refractory with a composition gradient were measured according to standard ASTM E-1461. The results are shown in Table 12 and Table 13.

TABLE 12 specific heat of the materials making up the outer layers of
the refractory with a composition gradient in the two examples
(MAS and CA6); the data for the material conventionally used
in combustion chambers (SAC) are included as a reference

| Specific heat $C_p$ Temperature [° C.] | Fire side (A) of example 1: MAS [J/(g · K)] | Fire side (A) of example 2: CA6 [J/(g · K)] | Bulk layer (C) of examples 1 and 2: SAC [J/(g · K)] |
|---|---|---|---|
| 500 | 0.96 ± 0.08 | 1.09 ± 0.05 | 1.03 ± 0.02 |
| 1000 | 1.72 ± 0.19 | 1.74 ± 0.20 | 1.65 ± 0.17 |

TABLE 13 thermal diffusivity of the materials making up the outer layers
of the refractory with a composition gradient in the two examples
(MAS and CA6); the data for the material conventionally used
in combustion chambers (SAC) are included as a reference

| Thermal diffusivity α Temperature [° C.] | Fire side (A) of example 1: MAS [mm²/s] | Fire side (A) of example 2: CA6 [mm²/s] | Bulk layer (C) of examples 1 and 2: SAC [mm²/s] |
|---|---|---|---|
| 500 | 0.92 ± 0.02 | 0.72 ± 0.01 | 0.59 ± 0.01 |
| 1000 | 0.86 ± 0.04 | 0.74 ± 0.03 | 0.61 ± 0.01 |

The thermal conductivity (K) was derived by applying the following formula:

$$K = \rho \cdot \alpha \cdot C_p$$

where ρ is the density of the material, varying as a function of temperature. These data were derived from measurements of thermal expansion performed on the materials. The results are shown in Table 14.

TABLE 14

Thermal conductivity of the materials making up the outer layers of the refractory with a composition gradient in the two examples (MAS and CA6); the data for the material conventionally used in combustion chambers (SAC) are included as a reference

| Thermal conductivity K Temperature [° C.] | Fire side (A) of example 1: MAS [W/(m · K)] | Fire side (A) of example 2: CA6 [W/(m · K)] | Bulk layer (C) of examples 1 and 2: SAC [W/(m · K)] |
|---|---|---|---|
| 500 | 2.24 ± 0.05 | 1.60 ± 0.08 | 1.43 ± 0.05 |
| 1000 | 3.72 ± 0.38 | 2.58 ± 0.28 | 2.33 ± 0.35 |

Depending on the thermal insulation requirements for the specific applications, the thicknesses of the layers A, B and C of the refractory with a composition gradient must be varied on the basis of these experimental results.

Measurement of Thermal Shock Resistance

Cylindrical test specimens with a diameter of 35 mm and height of 50 mm were obtained from the refractory with a composition gradient in order to assess the thermal shock resistance thereof according to standard DIN51068. According to this standard, the test specimens are subjected to thermal cycling comprising the following steps:
1. drying at 110±5° C. for 30 minutes;
2. introduction into a furnace set at a temperature of 950° C. with at least a 15-minute dwell after the set temperature has been reached;
3. extraction from the furnace and rapid cooling by immersion in cold water.

The test is considered to have been passed if the specimen withstands 30 thermal cycles.

Three test specimens were obtained from each of the refractory composites of the two examples to verify the repeatability of the thermal shock test on a minimum statistical basis. Test results are shown in Table 15.

TABLE 15

Result of thermal shock resistance test on the composites with a composition gradient

| Specimen no. | Example 1 (MR1) | Example 2 (BON) |
|---|---|---|
| 1 | Positive | Positive |
| 2 | Positive | Positive |
| 3 | Negative (breakage at 10th cycle) | Negative (breakage at 13th cycle) |

Figure 6:
FIG. 6: 3 refractory test specimens with a composition gradient as in example 1 (MR1) after a thermal shock test.

For both examples (MR1 and BON) it may be noted that (FIG. 6):
two out of three specimens passed the thermal shock test;
the third test specimen broke, with a fracture at the interface between layers, ascribable to the different thermal behaviour of the layers with a different chemical composition;
in all cases the refractory material making up the bulk layer of the refractory (SAC) was not damaged by the test.

These results demonstrate that
1. the material conventionally used to line combustion chambers (SAC) possesses excellent properties of thermal shock resistance;
2. the refractories with a composition gradient are more subject to thermal shock than the conventional refractories (SAC) because of the joining together of layers with a different dilatometric behaviour.

However, it is well known that dense comprising alumina or silicon carbide materials, considered an alternative that improves the property of corrosion resistance compared to conventional refractories, are easily subject to breakage due to thermal shocks. Therefore, the refractories with a composition gradient of the present invention represent an improved alternative in terms of resistance to thermal cycling.

Measurement of Refractoriness Under Load

This is a measurement serving to establish the maximum temperature at which refractories can be used.

The refractoriness under load of the refractory composites of the two examples was measured according to standard EN 993-8. It is a specific measurement of the behaviour of a refractory material subjected to the combined effects of a constant load (0.2 MPa) and a constant increase in temperature over time (5 K/min). A measurement is made of the curve of deformation of the test specimen in height as a function of temperature.

For the purpose of carrying out the test, standard cylindrical test specimens were obtained (d=50 mm and h=50 mm), with the axis of the cylinder oriented in a direction parallel to the composition gradient.

Figure 7:
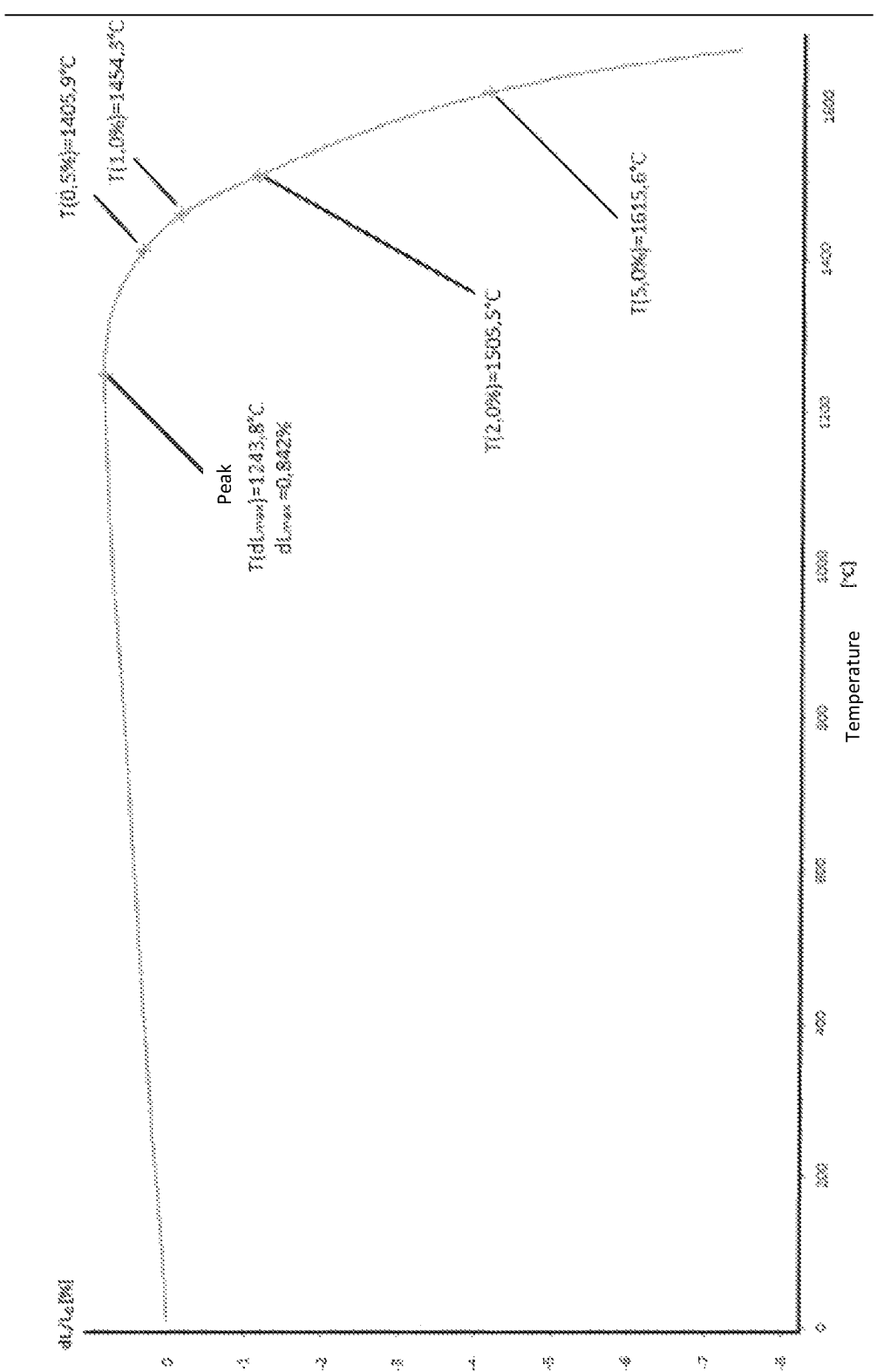
FIG. 7: Trend in refractoriness under load of the composite with a composition gradient MR1. $L_0$ indicates the length of the refractory material in the cylinder at the temperature of 0° C.; dL indicates the variation in the length of the refractory material in the cylinder; dLmax indicates the maximum variation in the length of the refractory material in the cylinder; T=temperature.

An example of a deformation measured on sample MR1 is shown in the graph in FIG. 7.

The results of the two tests are shown in Table 16.

TABLE 16

Results of the test of refractoriness under load conducted on the refractory composites of example 1 (MR1) and example 2 (BON)

| Refractoriness under load | Example 1 (MR1) | Example 2 (BON) |
|---|---|---|
| dLmax | 0.842% | 0.798% |
| T(dLmax) | 1,243.8° C. | 1,261.1° C. |
| T (0.5%) | 1,405.9° C. | 1,412.8° C. |
| T(1.0%) | 1,454.3° C. | 1,474.0° C. |
| T(2.0%) | 1,505.5° C. | 1,527.9° C. |
| T(5.0%) | 1,615.6° C. | — |

The results demonstrate that the refractories with a composition gradient of example 1 (MR1) and example 2 (BON) expand notwithstanding the applied load up to a temperature (TdLmax) of 1,243.8° C. and 1,261.1° C., respectively. Above these temperatures, phenomena of shrinkage begin to occur, which could limit their use.

Since the temperature of the combustion process (950° C.) for producing energy or for waste disposal is lower than the T(dLmax) of both examples, it can be affirmed with absolute confidence that the two refractories with a composition gradient (MR1 and BON) can be used to line the interior of combustion chambers.

The proposed solution displays a higher resistance to the corrosion due to the action of alkalis compared to the materials conventionally used (aluminosilicates).

When used as an alternative to the conventional refractory, the proposed solution moreover displays a better performance in thermal cycling than high density materials (alumina and SiC).

Finally, the proposed solution makes any higher costs of installing the multilayer refractory acceptable given the better performance of the material in terms of corrosion and thermal shock resistance, which makes it possible to reduce maintenance costs, with a net gain resulting from the reduction of downtimes between plant shutdowns and restarts.

The invention claimed is:

1. A refractory material with a composition gradient characterized by more than one layer with different chemical compositions, comprising at least:
   a) a layer A (fire side) of refractory material free of silica ($SiO_2$) comprising by weight:
   80 to 99% alumina ($Al_2O_3$),
   1 to 10% calcium oxide (CaO),
   0 to 10% magnesia (MgO),
   b) a layer C (bulk side) of refractory material comprising by weight:
   935 to 45% silica ($SiO_2$),
   50 to 90% alumina ($Al_2O_3$),
   0.5 to 5% calcium oxide (CaO),
   c) at least one layer B (intermediate layer) of refractory material, interposed between layer A and layer C, comprising a mixture of the material of layer A and the material of layer C, comprising:
   68 to 95.4% by weight of alumina ($Al_2O_3$),
   3.8 to 18% by weight of silica ($SiO_2$),
   0.8 to 8% by weight of calcium oxide (CaO),
   0 to 6% by weight of magnesia (MgO).

2. The refractory material with a composition gradient according to claim 1, wherein the refractory material of layer A has a particle size smaller than or equal to 6 mm, and the refractory material of layers B and C has a particle size smaller than or equal to 10 mm.

3. The refractory material with a composition gradient according to claim 1, wherein layers A and B have a thickness of 2 to 10 mm and layer C has a thickness of 10 to 80 mm.

4. The refractory material with a composition gradient according to claim 1, wherein the refractory material of layer B has a % by volume of the material of layer A varying from 50% to 75% and a % by volume of the material of layer C varying from 25% to 50%.

5. The refractory material with a composition gradient according to claim 1, comprising a number of layers B, each layer B having a % by volume of the material of layer A varying from 50% to 75% and a % by volume of the material of layer C varying from 25% to 50%, said material having a percentage by volume of the material of layer A which increases as a function of the distance of said layer B from layer C, so as to obtain a composition gradient.

6. A product consisting of the refractory material with a composition gradient according to claim 1, made by forming in moulds.

7. A lining for a combustion chamber, comprising the refractory material with a composition gradient according to claim 1, wherein layer A of said material with a composition gradient is facing towards the combustion room (fire side) and layer C is in the part at the back (bulk side).

8. Process for preparing the refractory material with a composition gradient as defined in claim 1, comprising the steps of:
   a) mixing the components of the material of layer C, adding distilled water dropwise until obtaining a homogeneous and fluid mixture;
   b) casting the mixture obtained in step a) in a mould so as to form a layer of homogeneous thickness;
   c) scratching the surface of layer C;
   d) mixing the components of the material of a first layer B 1, adding distilled water dropwise until obtaining a homogeneous and fluid mixture;
   e) casting the mixture obtained in step d) over layer C and distributing it so as to form a layer of homogeneous thickness;
   f) scratching the surface of layer B1;
   g) optionally mixing the components of the material of a second layer B2, adding distilled water dropwise until obtaining a homogeneous and fluid mixture;
   h) casting the mixture obtained in step g) over the preceding layer B and distributing it so as to form a layer of homogeneous thickness;
   i) scratching the surface of layer B2;
   j) optionally repeating steps g)-i) one or more times using the components of the material of a third layer B3, of a fourth layer B4 etc.;
   k) mixing the components of the material of layer A, adding distilled water dropwise until obtaining a homogeneous and fluid mixture;
   l casting the mixture obtained in step m) over the last layer B and distributing it so as to form a layer of homogeneous thickness; and
   m drying.

9. Process of applying the refractory material with a composition gradient as defined in claim 1 to the walls of a combustion chamber, comprising a step of spraying, with a spray gun, refractory mixes/mixtures with a different composition as defined in claim 1, according to the following sequence: spraying of the mixtures: layer C, at least one layer B, optionally one or more further layers B, and layer A.

10. Process of applying the refractory material with a composition gradient as defined in claim 1 to the walls of a combustion chamber, comprising a step of laying a lining consisting of the product consisting of the refractory material with a composition gradient according to claim 1 made by forming in moulds.

* * * * *